United States Patent [19]

Fiumani

[11] 4,272,845
[45] Jun. 9, 1981

[54] RECEIVER FOR DATA-TRANSMISSION SYSTEM OPERATING WITH SINGLE-SIDEBAND AMPLITUDE MODULATION

[75] Inventor: Francesco Fiumani, Settimo Milanese, Italy

[73] Assignee: Societa Italiana Telecomunicazion Siemens SpA, Milan, Italy

[21] Appl. No.: 85,794

[22] Filed: Oct. 17, 1979
(Under 37 CFR 1.47)

[30] Foreign Application Priority Data

Oct. 18, 1978 [IT] Italy ................................ 28849 A/78

[51] Int. Cl.³ .............................................. H04L 3/00
[52] U.S. Cl. ......................................... 375/20; 375/17
[58] Field of Search ..................................... 375/20, 17

[56] References Cited

U.S. PATENT DOCUMENTS 3,860,871  1/1975  Ninoshita ................................ 375/20

Primary Examiner—Harold I. Pitts
Attorney, Agent, or Firm—Karl F. Ross

[57] ABSTRACT

A receiver for three-level data signals transmitted by single-sideband amplitude modulation with an attenuated carrier, including an amplitude demodulator driven by the extracted carrier, comprises a phase shifter in the carrier input of the demodulator controlled by a phase-error detector which compares the demodulated baseband signals with a pair of balanced voltage thresholds to correct spurious phase shifts between that signal and the carrier. The phase-error detector receives timing pulses from a sync extractor comparing the baseband signal with two other balanced voltage thresholds and summing the results to control a local oscillator with a phase-locking loop. The phase shifter may be manually precalibrated to maximize the amplitude of a synchronizing signal in the output of the summing circuit of the sync extractor, that amplitude being proportional to the width of an eye diagram obtained from the baseband signal.

9 Claims, 5 Drawing Figures

RECEIVER FOR DATA-TRANSMISSION SYSTEM OPERATING WITH SINGLE-SIDEBAND AMPLITUDE MODULATION

FIELD OF THE INVENTION

My present invention relates to a receiver for an incoming message wave, arriving over a signal path such as a telephone line, which is formed by amplitude-modulating a high-frequency carrier with a three-level baseband signal derived from a binary train of data pulses and transmitting one of the resulting sidebands together with the attenuated carrier to the remote receiver.

BACKGROUND OF THE INVENTION

A system of this type, conforming to C.C.I.T.T. Recommendation V36 and utilizing the so-called Class IV partial-response technique, has been described for example in an article by Becker, Kretzmer and Sheehan entitled "A New Signal Format for Efficient Data Transmission", Bell System Technical Journal, May/June 1966. The carrier may have a frequency of, say, 100 KHz; the frequency spectrum of the sideband is of sinusoidal configuration and occupies a band of a width equal to half the bit cadence alongside the carrier.

At the receiver, the incoming message wave is subjected to amplitude demodulation under the control of the carrier which is separated from the remainder of that wave by filtering. The baseband signal recovered by the amplitude demodulator is then converted to binary form, corresponding to the original data pulses, with the aid of a local oscillation constituting a clock signal derived by a synchronization extractor, in the absence of a pilot tone, from the baseband signal itself. The latter signal, however, is subjected along the transmission path to distortion different from that undergone by the carrier, this resulting in spurious phase shifts therebetween. Such a phase error tends to narrow the eye diagram obtained when the baseband signal is visualized on the screen of an oscilloscope, thereby increasing the likelihood of a reading error due to phase jitter when that signal is sampled in the decoder at instants determined by the clock signal and timed to coincide with the center of the eye diagram.

OBJECT OF THE INVENTION

The object of my present invention, therefore, is to provide means in a receiver for a transmission system using single-sideband attenuated-carrier amplitude modulation, as discussed above, for widening the eye diagram as far as possible by substantially eliminating the aforementioned spurious phase shifts between the carrier and its modulating signal even when these phase shifts are caused by variable and unpredictable factors such as climatic conditions and the aging of circuit components.

SUMMARY OF THE INVENTION

I realize this object, in accordance with my present invention, by the insertion of phase-shifting means between the narrow-band carrier filter of the receiver and a collateral input of the amplitude demodulator to which the filtered-out carrier is fed, the phase-shifting means being connected to a phase-error detector having input connections to the amplitude demodulator and to the synchronization extractor for monitoring polarity reversals of the baseband signal and determining the relative time positions of the instants of zero crossing occurring during these reversals and a succession of timing pulses derived from the local oscillation. These timing pulses are spaced from the sampling pulses, fed to the decoder, so as to coincide ideally with whatever zero crossings occur in the baseband signal. Any time displacement between these zero crossings and the nearest timing pulses is therefore a measure, in both magnitude and sign, of the spurious offsets which are to be compensated. Thus, the phase-error detector has an output connection to the phase-shifting means associated with the amplitude demodulator for delivering thereto a corrective signal minimizing these offsets.

The phase-error detector advantageously includes a pair of comparators with inputs joined to a peak detector which is connected to the amplitude demodulator for establishing two balanced threshold levels whose magnitude depends on the maximum amplitude of the baseband signal. In order to eliminate insignificant transitions not amounting to full polarity reversals, the phase-error detector disregards those voltage changes which do not involve a traversal of both threshold levels as determined by these comparators.

Pursuant to another feature of my invention, the synchronization extractor comprises an amplitude-limiting circuit connected to the peak detector and to the amplitude demodulator for generating a clipped baseband signal with amplitudes lying between two balanced values also depending on the maximum amplitude of the signal appearing in the output of the demodulator, thereby making unnecessary the use of any voltage stabilizer. The clipped signal is fed to a narrow-band filter which extracts therefrom a dominant frequency component usable as a synchronizing signal for the control of a local oscillator provided with the usual phase-locking loop. The peak detector preferably comprises two RC networks connected between the amplitude demodulator and ground in series with respective rectifiers of relatively inverted polarities, the resitive branches of these networks forming a voltage divider with symmetrically positioned taps joined to inputs of the comparators of the phase-error detector and to inputs of a similar pair of comparators forming part of the synchronization extractor.

BRIEF DESCRIPTION OF THE DRAWING

The above and other features of my invention will now be described in detail reference to the accompanying drawing in which.

SPECIFIC DESCRIPTION

Figure 1:
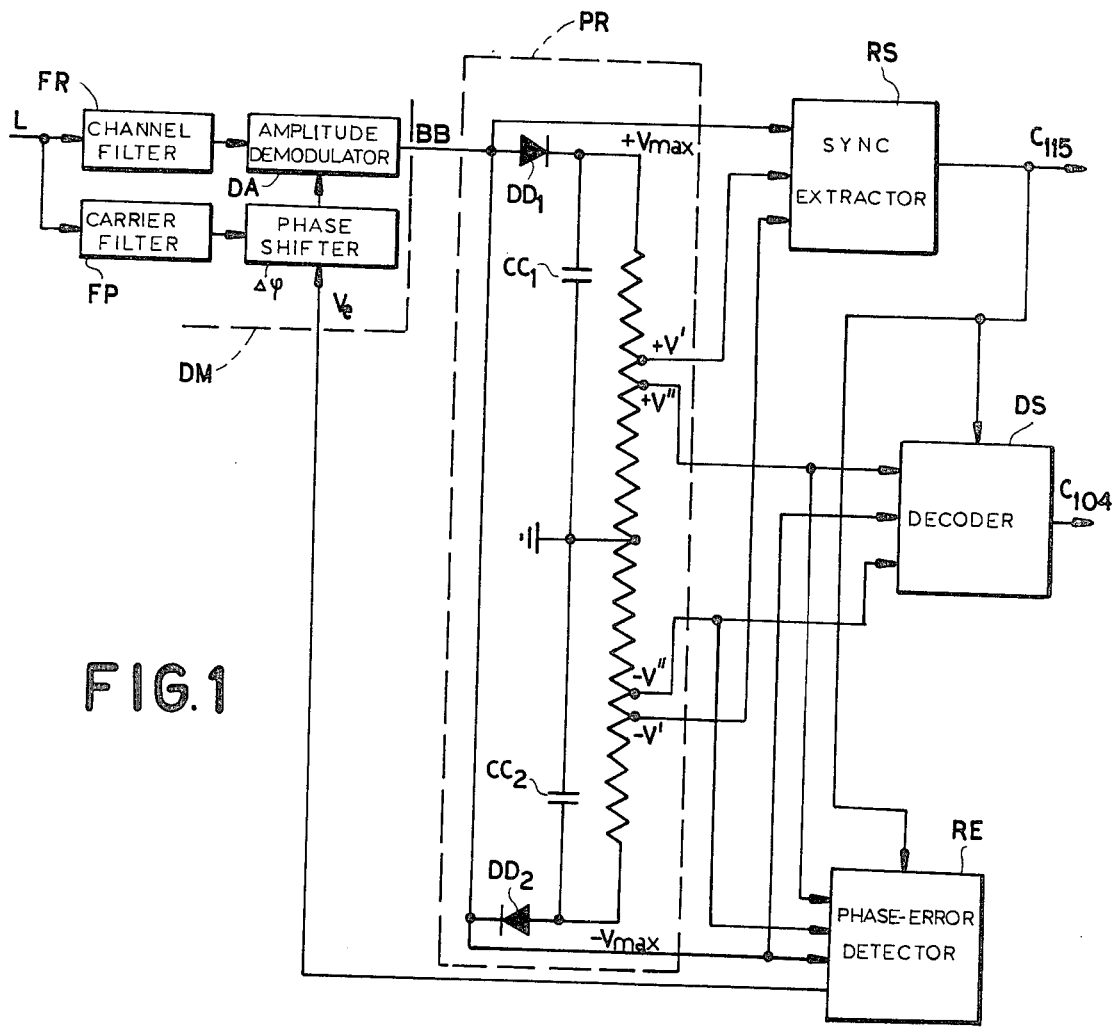
FIG. 1 is a circuit diagram, partly in block form, of a receiver embodying my invention.

In FIG. 1 I have shown a receiver for a message wave arriving over a line L, formed by a single sideband and an attenuated carrier, comprising a channel filter FR and a carrier filter FP connected in parallel to the line, an amplitude demodulator DA connected to filter FR, and a phase shifter $\Delta\phi$ inserted between filter FR and a collateral input of demodulator DA to which it delivers a phase-displaced replica P' of the filtered-out carrier P. The phase shifter $\Delta\phi$ has a control input, specifically the gate electrode of a field-effect transistor FT shown in FIG. 4, which receives a corrective signal $V_e$ from a phase-error detector RE.

Demodulator DA recovers a baseband signal BB from the incoming line signal and supplies it in parallel to a peak detector PR, a sync extractor RS, a conventional decoder DS and the phase extractor RE. Peak detector PR comprises two antiparallel diodes $DD_1$, $DD_2$ in series with two grounded RC networks comprising a pair of capacitors $CC_1$, $CC_2$ shunted by respective halves of a resistive voltage divider DV. The latter has taps delivering a pair of threshold voltages $+V'$, $-V'''$, balanced with respect to ground, to sync extractor RS and another pair of similarly balanced threshold voltages $+V''$, $-V''$ to error detector RE as well as to decoder DS. Extractor RS feeds a local oscillation $C_{115}$, constituting a clock signal, to decoder DS and error detector RE; the decoder emits a reconstituted binary pulse train $C_{104}$ to a nonillustrated load.

The potential levels tapped off voltage divider DV are predetermined fractions of the maximum amplitude $\pm V_{max}$ of signal BB, e.g. about half that amplitude in the case of threshold voltages $\pm V'$ and about three-fifths of that amplitude in the case of threshold voltages $\pm V''$.

Figure 2:
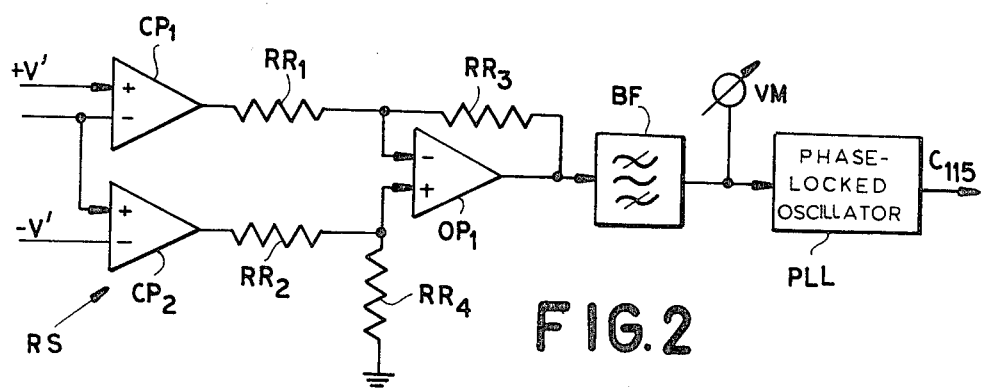
FIGS. 2, 3 and 4 are more detailed circuit diagrams of certain components shown in block form in FIG. 1.

FIG. 2 shows the sync extractor RS as comprising a pair of threshold comparators $CP_1$, $CP_2$ respectively receiving voltages $+V'$ and $-V'$ along with baseband signal BB. Comparator $CP_1$, conducting whenever the signal BB is more negative than voltage $+V'$, and comparator $CP_2$, conducting whenever that signal is more positive than voltage $-V'$, work by way of respective resistors $RR_1$, $RR_2$ into an inverting and a noninverting input of an operational amplifier $OP_1$; these two inputs are also tied to a feedback resistor $RR_3$ and to a grounded resistor $RR_4$, respectively. Amplifier $OP_1$, which sums the output signals of comparators $CP_1$ and $CP_2$, has its output connected to a band-pass filter BF which selects the dominant frequency component from the spectrum of the clipped baseband signal thus generated and supplies it to a synchronizing input of a crystal-controlled local oscillator PLL provided with a phase-locking loop, e.g. as shown in commonly owned U.S. patent application Ser. No. 61,480 filed July 27, 1979 by Riccardo Caldarella et al or Ser. No. 73,301 filed Sept. 7, 1979 by Bernardino Spada; oscillator PLL emits the clock signal $C_{115}$. A voltmeter VM also connected to the output of filter BF facilitates a preliminary calibration of phase shifter $\Delta\phi$ as described hereinafter with reference to FIG. 4.

Figure 5:
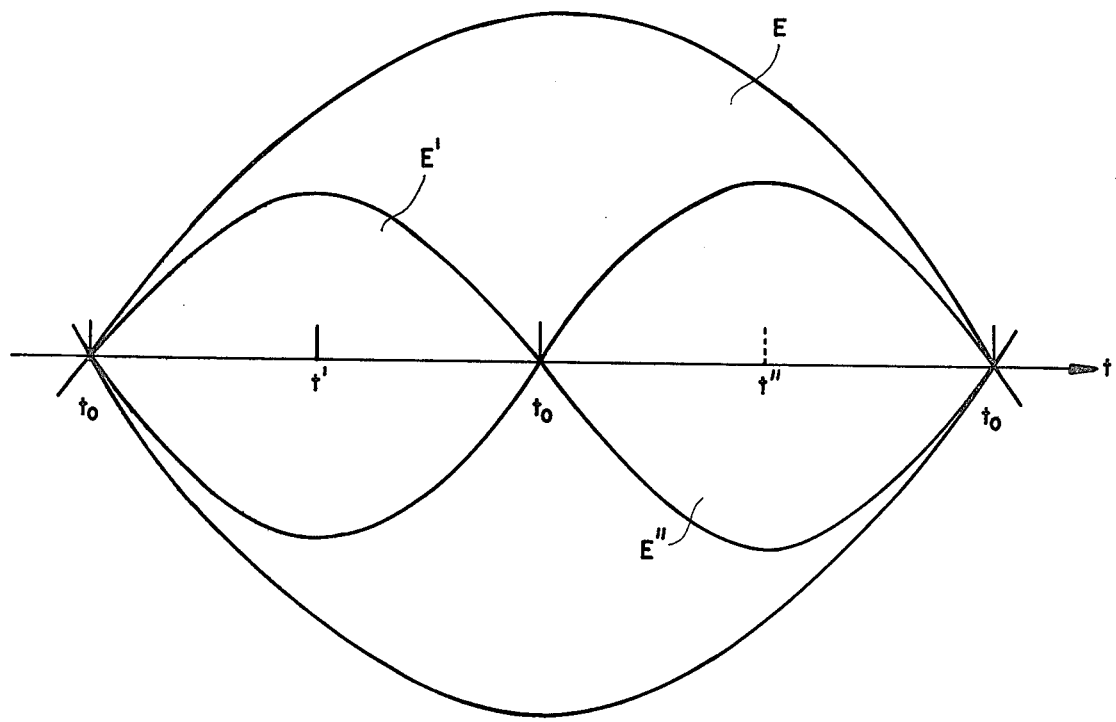
FIG. 5 is an eye diagram relating to the system of FIGS. 1-4.

FIG. 5 represents an eye diagram, similar to one shown in each of the above-identified commonly owned applications, obtained from the signal BB. This diagram comprises a larger eye E encompassing two smaller eyes E', E'' which may differ in width as pointed out in those applications. The decoder DS samples the baseband signal once per bit cycle, at an instant t' or t'' midway in eye E' or E''. The commonly owned applications describe various means by which sampling may be carried out exclusively in the wider one of the two smaller eyes.

Ideally, each of these eyes should have a width corresponding to half a recurrence period of sampling instants t' (or t''), defined by instants $t_o$. For this purpose, a differentiator D shown in FIG. 3 derives from clock signal $C_{115}$ a train of timing pulses $C_{115}'$ in the form of narrow spikes which occur at instants $t_o$ and have twice the cadence of the sampling pulses from which they are spaced by an odd number of quarter-cycles. If the baseband signal is properly centered relatively to the sampling pulses derived from the extracted clock signal, its zero crossings will exactly coincide with some of these timing pulses $C_{115}'$ at instants $t_o$. If there is a leading phase shift, signal BB will have positive polarity at instant $t_o$ during a positive-going transition and negative polarity on a negative-going transition; with a lagging error the relationship is reversed. Thus, the amplitude and sign of the signal at an instant $t_o$ coinciding with a polarity reversal are a measure of the offset between that instant and the actual zero crossing.

Figure 3:
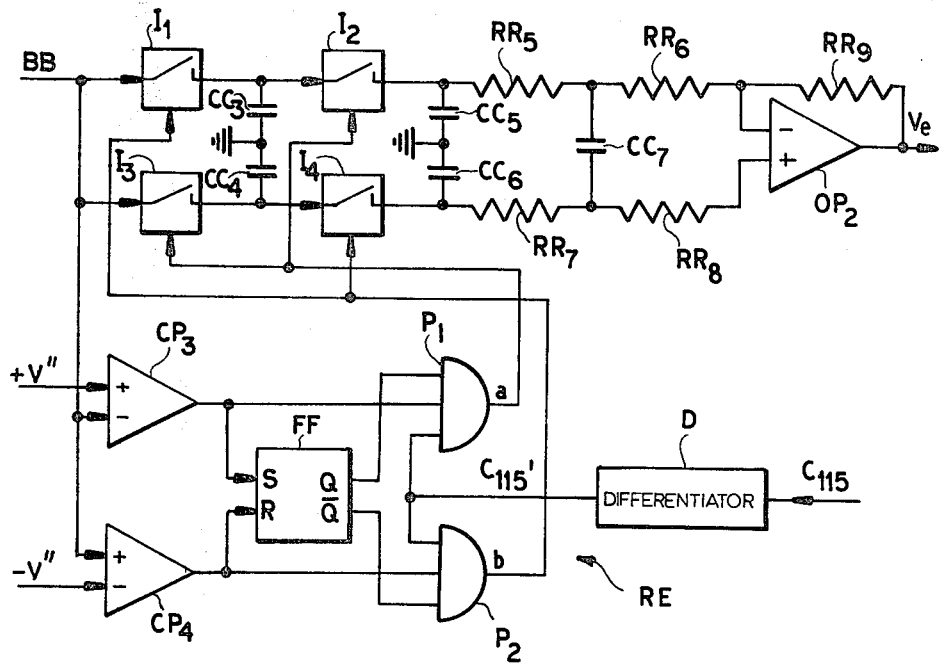

As further illustrated in FIG. 3, phase-error detector RE comprises a pair of threshold comparators $CP_3$, $CP_4$ respectively receiving voltages $+V''$ and $-V''$ along with signal BB. Comparator $CP_3$, conducting whenever the signal BB is more negative than voltage $+V''$, works into a setting input S of a flip-flop FF and into one input of a three-input AND gate $P_1$ having a second input tied to the set output Q of the flip-flop. Comparator $CP_4$, conducting whenever the signal BB is more positive than voltage $-V''$, analogously works into a resetting input R of flip-flop FF and into one of another three-input AND gate $P_2$ having a second input tied to the reset output $\overline{Q}$ of the flip-flop. The remaining inputs of gates $P_1$ and $P_2$ receive the timing pulses $C_{115}'$ from differentiator D. With suitable signal inversions, these AND gates could be replaced by other coincidence gates such as those of the NAND or NOR type.

Baseband signal BB is also delivered to a sample-and-hold circuit with two parallel branches comprising respective storage capacitors $CC_3$ and $CC_4$ having a grounded junction, two electronic switches $I_1$, $I_3$ upstream of these capacitors and two other such switches $I_2$, $I_4$ on their downstream sides. Each of these switches may comprise a filled-effect transistor followed by an operational amplifier. Gate $P_1$, when conducting, applies a transfer command a to control electrodes of downstream switch $I_2$ of the first branch and upstream switch $I_3$ of the second branch; gate $P_2$, in its conductive state, energizes control electrodes of the other two switches with a transfer command b. Switches $I_2$ and $I_4$ are connected across a pair of grounded transfer capacitors $CC_5$, $CC_6$ and via resistance arms $RR_5$, $RR_6$ and $RR_7$, $RR_8$ of an integrating network, also including a shunt capacitor $CC_7$, to inverting and noninverting inputs of an operational amplifier $OP_2$ which produces the corrective signal $V_e$ from the difference of the integrated signal samples stored on capacitors $CC_5$ and $CC_6$.

Signal BB may be regarded as having the ternary values "+1" between levels $+V_{max}$ and $+V'$, "0" between levels $+V'$ and $-V'$, and "−1" between levels $-V'$ and $-V_{max}$. When it is in range "+1", only comparator $CP_2$ conducts so that flip-flop FF is reset and one or more timing pulses $C_{115}'$ traverse the AND gate $P_2$ to become the transfer command b which briefly closes the switches $I_1$ and $I_4$ to charge the capacitor $CC_3$ with a sample of signal BB and to transmit a previously stored sample from capacitor $CC_4$ to capacitor $CC_6$. When signal BB changes polarity, a traversal of level $+V'$ renders comparator $CP_3$ conductive but does not yet cause a setting of flip-flop FF whose resetting input R is still energized, thus leaving gate $P_1$ cut off while the baseband signal is in range "0". During that interval, a timing pulse $C_{115}'$ occurs either at the precise moment of zero crossing or at some instant offset therefrom so that switch $I_1$ samples the baseband signal at the time $t_o$ (FIG. 5) and stores the instantaneous signal amplitude on capacitor $CC_3$ as a measure of the offset, if any. Since this occurs on the descending edge of signal BB, the sample so stored is negative in the case of a leading phase error and positive in the case of a lagging one. It should be noted, however, that this sample is transferred to capacitor $CC_5$ only if signal BB then traverses level $-V'$ to cut off the comparator $CP_4$ and the gate $P_2$ while flip-flop FF is being set and gate $P_1$ becomes transparent to the timing pulses $C_{115}'$ upon entry into range "$-1$". The next timing pulse then passes the NAND gate $P_1$ to become the transfer command a which closes the switches $I_2$ and $I_3$ for a brief instant, thereby transmitting the sample last stored on capacitor $CC_3$ to capacitor $CC_5$ while capacitor $CC_4$ receives the instanteous amplitude of signal BB. If at that time—or at a subsequent instant $t_o$—the baseband signal again changes polarity to return to range "$+1$", the sample transferred from capacitor $CC_4$ to capacitor $CC_6$ will be positive with a leading phase error and negative in the opposite case. The corrective signal $V_e$ in the output of amplifier $OP_2$, therefore, will have a polarity unequivocally determined by the sense of the spurious phase shift, i.e. positive for a lead and negative for a lag. Regardless of the number of timing pulses intervening between consecutive polarity reversals, samples taken during positive-going transitions are always stored on capacitor $CC_4$ whereas those taken during negative-going transitions reach the capacitor $CC_3$. Voltage changes not involving successive traversals of both thresholds $+V'$ and $-V'$ (in either sequence), i.e. consecutive transitions of ranges "$+1$", "0", "$+1$" or "$-1$", "0", "$-1$" with or without actual crossing of the zero line, do not charge the transfer capacitors $CC_5$, $CC_6$, thanks to the cross-connection between gates $P_1$, $P_2$ and electronic switches $I_1$-$I_4$.

Figure 4:
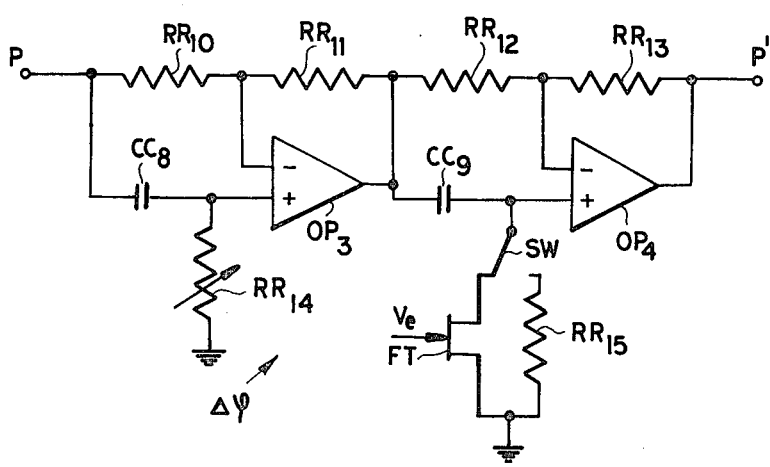

An advantageous embodiment of phase shifter $\Delta\phi$ has been illustrated in FIG. 4 which shows two cascaded operational-amplifier stages $OP_3$, $OP_4$ having inverting inputs tied to the junctions of input resistors $RR_{10}$, $RR_{12}$ with feedback resistors $RR_{11}$, $RR_{13}$ and having noninverting inputs connected to resistive/capacitive circuits including respective series capacitors $CC_8$, $CC_9$. The resistive shunt branch of one of these circuits, here the one of the upstream stage, is formed by a manually adjustable resistor $RR_{14}$; the corresponding branch of the other R/C circuit comprises the aforementioned field-effect transistor FT whose gate electrode receives the corrective signal $V_e$ from amplifier $OP_2$ of FIG. 3, possibly after further amplification, with the proper polarity to modify the phase displacement between the incoming carrier P and the shifted carrier P' fed to the demodulator DA of FIG. 1. A manual switch SW enables the substitution of a fixed resistor $RR_{15}$ for transistor FT during a calibrating operation, resistor $RR_{15}$ having a magnitude corresponding to the source/drain resistance of the transistor when its gate is grounded. With switch SW in its calibrating position, resistor $RR_{14}$ can be adjusted until the reading of voltmeter VM in FIG. 2 is a maximum, indicating an optimum phasing of carrier P' relative to baseband signal BB (which corresponds to a maximum width of the eye diagram). In operation, deviations from this optimum phasing due to such factors as temperature changes and aging are automatically compensated by the corrective signal $V_e$, as hereinabove described.

I claim:

1. A receiver for an incoming message wave formed by an attenuated carrier and a single sideband of the same carrier amplitude-modulated by a three-level baseband signal, comprising:

filter means for separating the carrier from the incoming message wave;
   an amplitude demodulator having a message-wave input and further having a collateral input connected to said filter means for recovering the baseband signal from said message wave under the control of said carrier;
   phase-shifting means inserted between said filter means and said collateral input;
   a synchronization extractor connected to said amplitude demodulator for deriving from said baseband signal a local oscillation giving rise to sampling pulses and to timing pulses spaced from said sampling pulses;
   a phase-error detector with input connections to said amplitude demodulator and to said synchronization extractor for monitoring polarity reversals of said baseband signal and determining the relative time positions of said timing pulses and of the instants of zero crossing during said polarity reversals, said phase-error detector having an output connection to said phase-shifting means for delivering thereto a corrective signal varying with said relative time positions to minimize spurious offsets between said carrier and said baseband signal; and
   decoding means connected to said amplitude demodulator and controlled by said sampling pulses for converting said baseband signal into a binary pulse train.

2. A receiver as defined in claim 1, further comprising peak-detecting means connected to said amplitude demodulator for establishing two balanced threshold levels of a magnitude depending on the maximum amplitude of said baseband signal, said phase-error detector including a pair of comparators with inputs joined to said peak-detecting means and to said amplitude demodulator for disregarding polarity reversals failing to traverse both said threshold levels.

3. A receiver as defined in claim 2 wherein said phase-error detector further comprises sample-and-hold circuitry connected to said amplitude demodulator, a flip-flop with setting and resetting inputs respectively connected to said comparators for switchover in response to traversals of said threshold levels by said baseband signal, gating means having inputs connected to set and reset outputs of said flip-flop, to said synchronization extractor and to said comparators for emitting a first transfer command upon occurrence of a timing pulse after successive traversals of said threshold levels in a predetermined sequence and emitting a second transfer command upon occurrence of a timing pulse after successive traversals of said threshold levels in a reverse sequence, said sample-and-hold circuitry including switching means connected to said gating means for respectively storing a first and a second amplitude sample of said baseband signal in response to said first and second transfer commands and for respectively emitting the stored first and second amplitude samples in response to said second and first transfer commands, and integrating means connected to said sample-and-hold circuitry for transforming the emitted first and second amplitude samples into said corrective signal.

4. A receiver as defined in claim 3 wherein said gating means comprises a pair of three-input coincidence gates, said sample-and-hold circuitry comprising a first and a second circuit branch each including a storage capacitor and two electronic switches respectively disposed upstream and downstream of said capacitor, one of said coincidence gates having output connections to the upstream switch of one and to the downstream switch of the other circuit branch, the other of said coincidence gates having output connections to the upstream switch of said other and to the downstream switch of said one circuit branch.

5. A receiver as defined in claim 2, 3 or 4 wherein said synchronization extractor comprises amplitude-limiting means with inputs connected to said peak-detecting means and to said amplitude demodulator for generating a clipped baseband signal with amplitudes lying between two balanced values depending on said maximum amplitude, a band-pass filter connected to said amplitude-limiting means for passing said clipped baseband signal, and a phase-locked oscillator having a synchronizing input connected to said band-pass filter.

6. A receiver as defined in claim 5 wherein said peak-detecting means comprises two RC networks connected between said amplitude demodulator and ground in series with respective rectifiers of relatively inverted polarities, said networks having resistive branches together forming a voltage divider, said amplitude-limiting means including another pair of comparators, the comparators of each pair having inputs joined to symmetrically positioned taps of said voltage divider.

7. A receiver as defined in claim 6 wherein said amplitude-limiting means further comprises an operational with inverting and noninverting inputs respectively connected to said other pair of comparators.

8. A receiver as defined in claim 5 wherein said phase-shifting means is provided with an adjustable impedance for varying the phase displacement of said carrier independently of said corrective signal, said synchronization extractor being provided with voltage-measuring means connected to said synchronizing input for indicating an optimum position of adjustment of said impedance.

9. A receiver as defined in claim 8 wherein said phase-shifting means comprises two cascaded operational-amplifier stages having resistive/capacitive input circuits, said adjustable impedance being part of one of said input circuits, the other of said input circuits including a transistor with a control electrode receiving said corrective signal.

* * * * *